Patented Nov. 18, 1924.

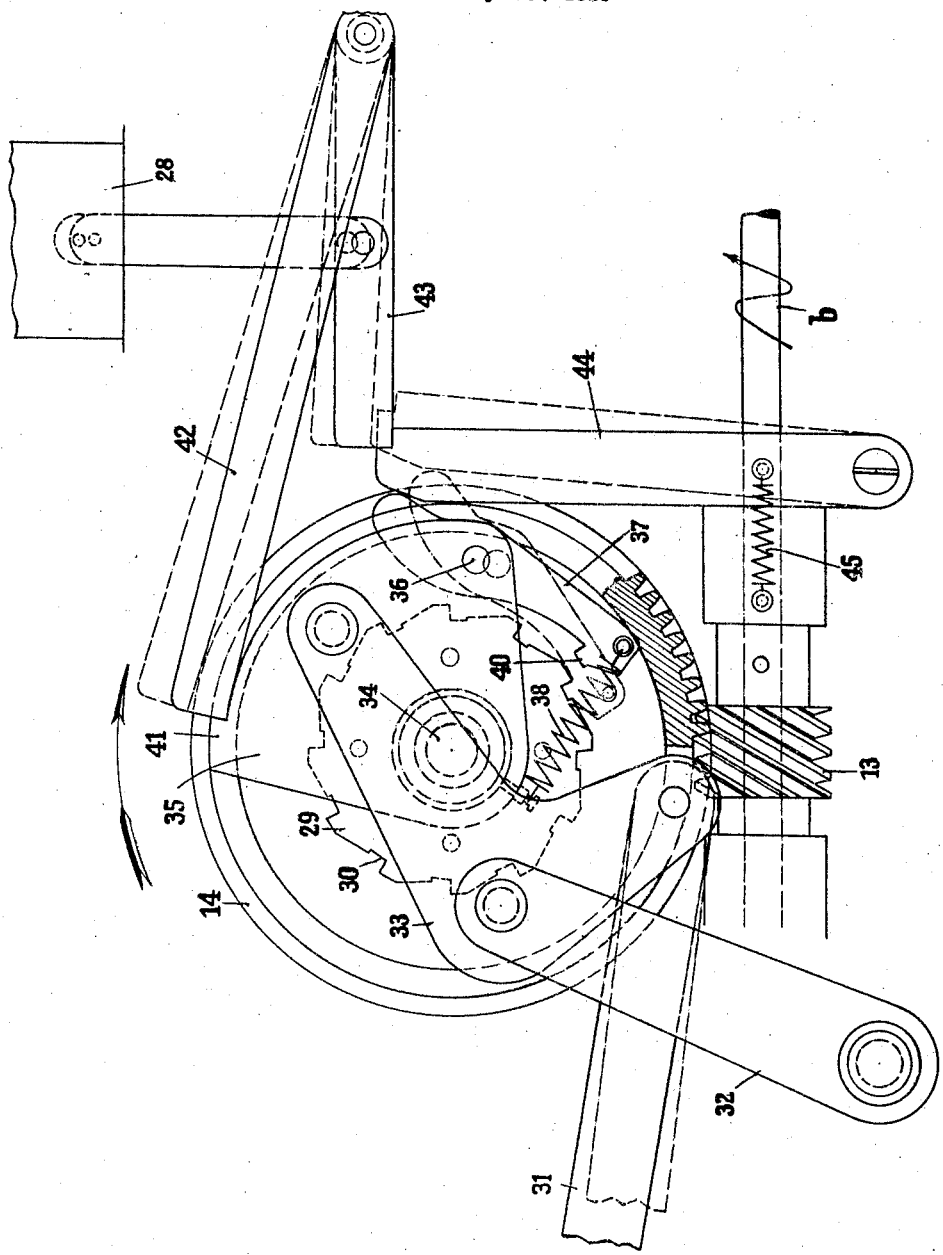

1,515,966

UNITED STATES PATENT OFFICE.

FRANZ RAUCHWETTER, DECEASED, LATE OF BERLIN-FRIEDENAU, GERMANY; BY ANNA RAUCHWETTER, NÉE BÖHME, ADMINISTRATRIX, OF BERLIN-FRIEDENAU, GERMANY; ALFRED FLATER PRESENT ADMINISTRATOR OF SAID FRANZ RAUCHWETTER, DECEASED.

MOTOR DRIVE FOR CALCULATING MACHINES.

Application filed May 19, 1921. Serial No. 471,016.

*To all whom it may concern:*

Be it known that FRANZ RAUCHWETTER, deceased, late a citizen of the German Republic, residing at Berlin-Friedenau, Germany, has invented certain new and useful Improvements in Motor Drives for Calculating Machines, of which the following is a specification.

The object of the present invention is an improvement to such motor drives for calculating machines with which a single control of the spindle of the machine from an electric motor is effected by a combination disk and screw coupling, the drive being stopped by an electro-magnetic release after one turn of the transmission-worm gear. A calculating machine of such a type is shown and described in the United States specification No. 1,239,622. In order to do away with the complicated and delicate laminated disk and screw coupling, according to the present application the operating mechanism for imparting a pendulum motion to the toothed segment is not driven immediately from the worm gear, but through the intermediate of a locking gear which is released and stopped from the armature of the electro-magnet after one revolution of the driving worm gear.

My invention is illustrated, by way of example, in the accompanying drawing in which is shown a side-view of the mechanism. The worm (13) is not coupled to the motor spindle through the intermediary of a laminated disk and screw coupling, but is placed direct upon the motor spindle (*b*) therefore turning permanently with the latter. This worm (13) engages into the worm gear (14) which likewise turns permanently. Upon the worm wheel (14) is mounted the ratchet wheel (29) the ratchet teeth of which are so shaped that there is formed between the radial end surface of every tooth and the oblique commencement of the subsequent tooth a special gap (30). 33 is a bell-crank lever which is mounted on a rocking arm (32). The lower arm of the bell-crank lever 33 is connected by a rod 31 with transfer-mechanism (not shown as it does not form a part of this invention), and the upper arm of said lever (33) is hinged to a disk (35), mounted loose upon the worm gear spindle (34). To the disk (35) is attached a pawl (37) in such a manner that it can swing on the pivot (36). Under the action of a spring (38) this pawl with its finger (40) tends to drop into the teeth of the ratchet wheel (29). The disk (35) is prevented from turning by a pawl (42) catching against a projection (41) on the disk. This pawl (42) may be raised, by means of an electromagnet (28), together with pawl (43), the latter locking a lever (44). If the electro-magnet is switched in, thereby raising the pawls (42) and (43), the disk (35) is released, as is also the lever (44). This latter lever can be pressed into the position shown in dotted lines by means of the pawl (37) under the action of the tension spring (38), which is opposed to the spring (45) fitted to the pawl, at the same time moving the pawl into the reach of the teeth of the ratchet wheel (29). As, however the ratchet wheel (29), rotates, it grips the pawl (37) in a certain position and takes it along in the direction of rotation. Thereby the disk (35) and the bell crank (33) are turned likewise, i. e. the rod 31 is reciprocated in order to actuate the transfer mechanism. Whenever the disk (35) with the worm gear (14) has completed one revolution, it engages the pawl (42) which has meanwhile dropped into the position of rest, and is thereby arrested. At the same time the pawl (37) is released from the teeth of the ratchet wheel (29) by the lever (44) which is again locked now by the pawl (43), whereby the lever mechanism of the segment (15) is arrested again in the normal position after one revolution of the worm gear (14). The gaps (30) of the ratchet wheel (29) serve for avoiding relative alterations of the position of the ratchet wheel (29) with regard to the disk (35) caused by the inertia of the mechanism.

Claims:

1. A motor drive for calculating machines, comprising, in combination, a continuously rotating shaft, a worm affixed to the shaft, a worm-wheel meshing with the worm, an axle carrying the worm-wheel, a disk arranged loosely on said axle, means to couple the disk periodically with said axle, a bell-crank lever hinged at one of its ends to said disk, an oscillatable arm hinged to the machine frame and supporting the bell-crank lever in the middle part thereof, and a rod hinged to the other end of the said bell-crank lever and being adapted to transmit motion to another part of the respective calculating machine, as set forth.

2. A motor drive for calculating machines, comprising, in combination, a continuously rotating shaft, a worm affixed to the shaft, a worm-wheel meshing with the worm, an axle carrying the worm-wheel, a disk arranged loosely on said axle, a ratchet wheel arranged co-axially with said worm wheel and rotating together therewith, a pawl fulcrumed at said disk, a spring tending to make said pawl engage the ratchet wheel; a lever so arranged relatively to the pawl as to be adapted to counteract said spring; another pawl so arranged relatively to said lever as to be adapted to maintain it in the position in which it holds the first-mentioned pawl out of contact with the said ratchet-wheel, electromagnetic means connected with said second pawl, an oscillable arm hinged to the machine frame and supporting the bell-crank lever in the middle part thereof, and a rod hinged to the other end of the said bell-crank lever and being adapted to transmit motion to another part of the respective calculating machine, as set forth.

In testimony whereof I affix my signature in presence of two witnesses.

FRAU ANNA RAUCHWETTER née BÖHME,
*Administratrix of Franz Rauchwetter, deceased.*

Witnesses:
HERMANN REISING,
WALDEMAR WERNISKI.